United States Patent
Ming

[11] Patent Number: 6,031,854
[45] Date of Patent: Feb. 29, 2000

[54] DIODE-PUMPED CASCADE LASER FOR DEEP UV GENERATION

[76] Inventor: Lai Ming, 6450 Dougherty Rd. #125, Dublin, Calif. 94568

[21] Appl. No.: 09/382,183

[22] Filed: Aug. 24, 1999

Related U.S. Application Data

[60] Provisional application No. 60/098,398, Aug. 31, 1998.

[51] Int. Cl.[7] .......................................................... H01S 3/10
[52] U.S. Cl. .................. 372/22; 372/12; 372/13; 372/5; 372/72; 372/92; 372/99; 372/100
[58] Field of Search ..................... 372/22, 10, 9, 372/25, 21, 99, 41, 92, 70, 71, 5, 97, 12, 13, 72, 100

[56] References Cited

U.S. PATENT DOCUMENTS

| | | | |
|---|---|---|---|
| 4,380,076 | 4/1983 | Bethume | 372/72 |
| 5,144,630 | 9/1992 | Lin. | |
| 5,371,758 | 12/1994 | Dougal | 372/70 |
| 5,548,608 | 8/1996 | Zhang | 372/72 |
| 5,825,562 | 10/1998 | Lai et al. | |

*Primary Examiner*—Leon Scott, Jr.

[57] ABSTRACT

A two-step, diode-pumped solid-state laser is disclosed. A diode laser source pumps a first solid-state laser. The first solid-state laser in-turns pumps a second solid-state laser. The second solid-state laser contains all the parameters suitable for efficient deep UV generation. A direct application of the diode-pumped solid-state cascade laser is for deep UV generation for photo-refractive surgeries.

15 Claims, 4 Drawing Sheets

DIODE-PUMPED CASCADE LASER FOR DEEP UV GENERATION

This application claims the benefit of U.S. provisional application Ser. No. 60/098,398, filed on Aug. 31, 1998.

FIELD OF THE INVENTION

The present invention relates to a diode-pumped solid-state laser device. In particular, the present invention relates to a diode-pumped two-step laser source that is suitable for deep UV generation.

BACKGROUND OF THE INVENTION

Using diode-pumped solid-state lasers to generate deep UV around 200 nm is greatly desirable for photo-refractive surgeries. Such a deep UV laser source is expected to be more compacts, more reliable, and less maintenance in comparison with the excimer lasers, which is currently the dominant laser source for photo-refractive surgeries. More importantly, solid-state laser sources can be operated at a much higher repetition rate and much less energy fluctuation than the excimer lasers. Scanning a deep UV laser beam with high repetition rate enables a variety of ablation shapes on a cornea surface and provides a great flexibility for the refractive surgeries. The improved stability in pulse energy from a solid-state UV laser source ensures accurate and controllable ablation.

To obtain such a diode-pumped solid-state laser source, a pulsed infrared laser beam with suitable laser parameters should be first generated and then efficient wavelength conversion can be applied for high-order harmonic generations. The important laser parameters include the laser wavelength, spectral width, pulse duration, pulse energy, pulse repetition rate, and beam quality. It is difficult, however, to achieve in a single step all the right parameters from a diode-pumped solid-state laser. Diode-pumped solid-state lasers operated at kilohertz and millijole level are basically Nd-doped lasers pumped with diode-laser sources near 800 mn. When they are simply Q-switched, these lasers produce laser pulses of 30 to 100 ns in duration. With the nonlinear crystals available nowadays, this pulse duration is too long to produce an effective deep UV generation without optical damaging. The beam quality and the pulse energy are competitive parameters of these lasers. Because of their simplicity and high pulse energy, these lasers are popular and less expensive. They are commercial available from Cutting Edge Optronics of Saint Charles, Mo., and Lee Laser of Orlando, Fla.

A more complicate master-oscillator and power-amplifier laser system can produce shorter pulses and better beam quality at a much higher cost. Such a system may have a Q-switched oscillator pumped longitudinally by a high brightness diode laser. The oscillator produces a low-energy pulse of about 10 ns in duration. A diode-pumped power amplifier boosts the pulse energy to the millijole level. Deep UV generation with these lasers can achieve an efficiency of about 5%. With these 10-ns laser sources, optical damage has been an important issue on the nonlinear crystal for deep UV generation near 200 nm. Continuous movement of the nonlinear crystal may be required to avoid optical damage (U.S. Pat. No. 5,825,562 to Lai et al.) Laser systems of master-oscillator and power-amplifier are commercially available from Lambda Physik GmbH of Germany and from Continuum of Santa Clara, Calif.

An even more complicate master-oscillator and power-amplifier laser system may include a mode-locked oscillator and a regenerative amplifier. Pulses of about 100 ps in duration can be generated and pulse energy of about 1 millijole can be obtained at kilohertz repetition rate. A conversion efficiency of about 10% can be achieved for deep TV generation. Optical damage on the UV crystal is not much a problem with these short-pulse systems. The operation condition and maintenance of these systems are, however, so demanded that they be mainly used in laboratory environment. Commercial product is available from Spectra-Physics Lasers of Mountain View, Calif.. System price can be well over $200,000.

Another limitation for diode-pumped solid-state lasers operated at kilohertz and millijole level is the laser wavelength. Only for the Nd-doped laser materials, the diode pump sources have been well developed to have enough power and lifetime. Practically, laser wavelength from these lasers is limited to near 1060 or 1320 nm. As a result, their second harmonics is limited to near 530 or 660 nm.

SUMMARY OF THE INVENTION

Many laser parameters can be modified through a laser-pumped laser. The second laser may have a new wavelength and a better beam quality. The second laser can be simply gain-switched to produce a laser pulse shorter than the pump pulse. Besides, a laser-pumped laser may use a very simple resonant cavity and require minimal maintenance.

The present invention contemplates a diode-pumped cascade laser that can achieve all the laser parameters suitable for deep UV generation. A first solid-state laser pumped by a diode-laser source is Q-switched to produce short laser pulses of multiple-millijole energy. A second solid-state laser pumped by the first solid-state laser is then gain-switched to produce even shorter laser pulses. Such a cascaded laser source makes it feasible to optimize all laser parameters for deep UV generation. One aspect of the present invention is to provide a new and improved diode-pumped solid-state laser source for deep UV generation. Another aspect of the present invention is to provide a new and improved deep UV laser source for photo-refractive surgeries.

There are several schemes to produce a diode-pumped cascade laser of the present invention. The diode pump source can be a diode laser array or a stack of the arrays. The pump source can be operated at continuous wave mode or quasi-continuous wave mode. Either end pump or side pump configuration can be applied for this application. The pump power is approximately of 10 to 100W. The pump laser wavelength is near 800 nm, tuned to match the absorption line of the first laser gain medium.

The first solid-state laser is a Neodymium-doped laser, such as Nd: YLF, Nd: YAG, or Nd: YVO4. This first laser is Q-switched to produce laser pulses shorter than 50 ns in duration and about 0.5 to 5 kHz at repetition rate. This laser is further frequency doubled to a wavelength near 530 or 660 nm.

Either intracavity or extra-cavity doubling can be used. Multiple-mode pulse energy of approximately 2 to 10 mJ should be obtained.

The output pulses from the first solid-state laser pump the second solid-state laser. This second solid-state laser is gain-switched to produce a TEM00 laser beam with pulse duration of about 1 ns and pulse energy of about 1 mJ. The laser wavelength can be around either 840 nm or 1060 nm so that the fourth or fifth harmonics will lead to a deep UV beam around 210 nm. The spectrum bandwidth of the pulses should be of 0.01 nm or narrower so that efficient energy conversion to the UV power can be obtained. The laser medium can be Ti: sapphire, Cr: LiSAIF, or Nd-doped crystals.

The second solid-state laser may also be Q-switched by using an additional Q-switch modulator. In this case, the second Q-switch should be synchronized with the first Q-switch of the first solid-state laser.

The output beam from the second solid-state laser is then directed into a wavelength converter to produce a deep UV laser beam. The nonlinear crystal for the second or third harmonics generation can be KTP, LBO, BBO, or CLBO. BBO is practically the only crystal for deep UV generation near 210 nm. CLBO is a potential one for the future. The crystal selection and the harmonics generations are well known in the art.

The proposed diode-pumped cascade laser of the present invention can be rather compact, easy to manufacture, and less demanded for service. Consequently, the production cost and operation cost are expected low enough to make the solid-state laser technology more appreciable for the application of photo-refractive surgeries. These and other aspects and advantages of the invention will become more apparent in the following drawings, detailed description and claims.

DETAILED DESCRIPTION OF PREFERRED EMBODIMENTS

Figure 1:
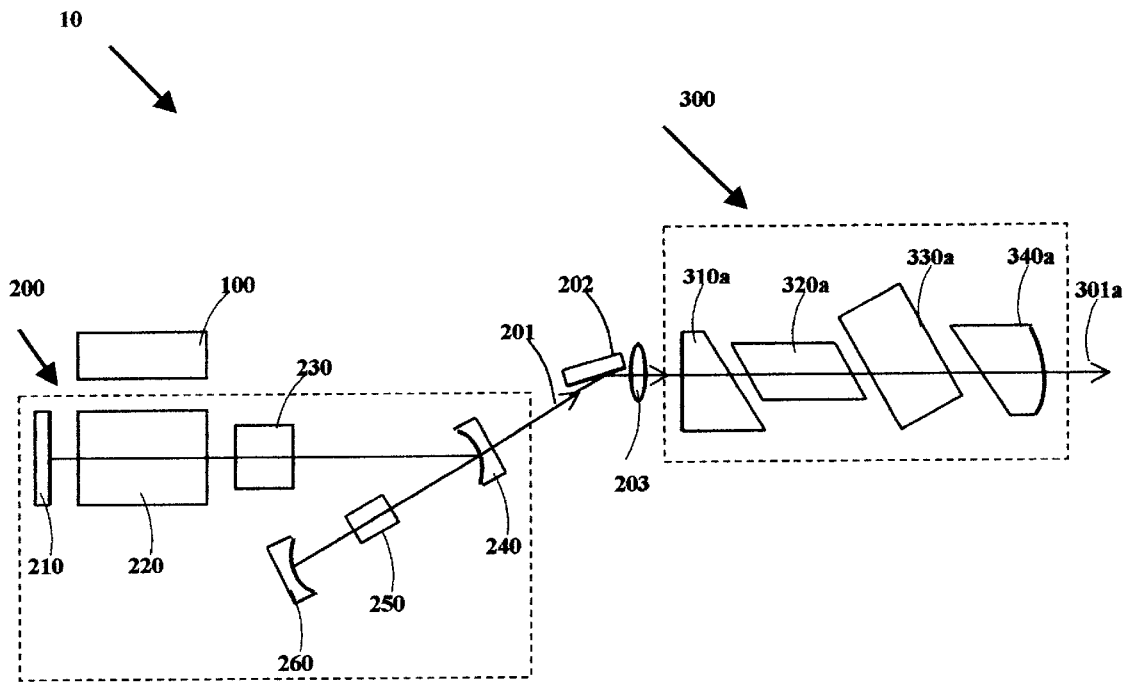
FIG. 1 is a schematic diagram showing one embodiment of a diode-pumped solid-state cascade laser in accordance with the present invention.

FIG. 1 is a schematic diagram showing one embodiment of a diode-pumped solid-state cascade laser 10 in accordance with the present invention. The laser 10 can be divided into a diode pump source 100, a first solid-state laser 200, and a second solid-state laser 300. The diode pump source 100 pumps the first laser 200. The first laser 200 then pumps the second laser 300. The output beam 201 from the first laser 200 is directed into the second laser 300 via optics 202 and 203. The output beam 301a of the second laser 300 contains all the parameters suitable for deep UV generation.

Figure 2:
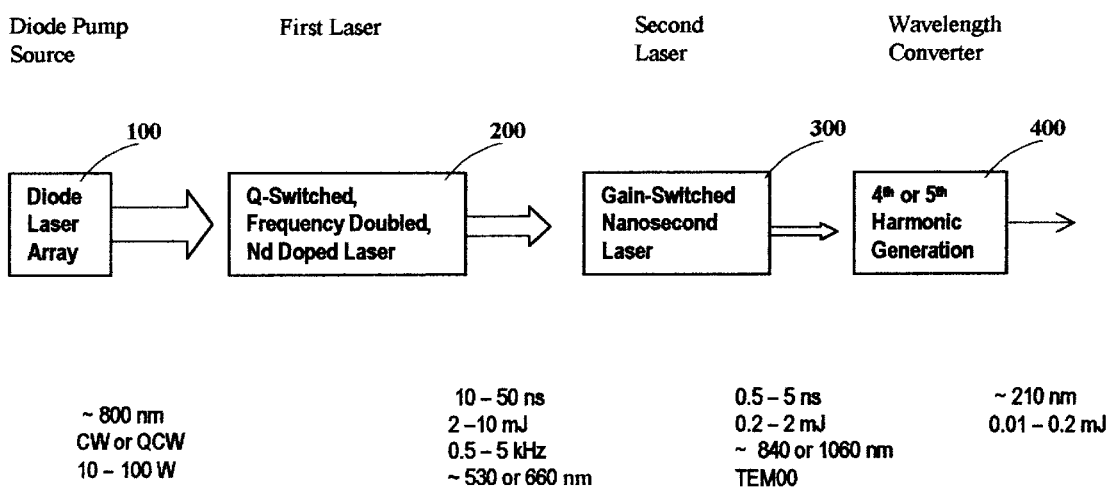
FIG. 2 is a block diagram showing the concept of a diode-pumped solid-state cascade laser for deep UV generation.

FIG. 2 is a block diagram showing the concept of the present invention of a diode-pumped solid-state cascade laser for deep UV generation. The diagram consists of four blocks representing a diode pump source 100, a first solid-state laser 200, a second solid-state laser 300, and a wavelength converter 400.

The diode pump source 100 is a diode laser array or a stack of the arrays. The pump laser energy is optically coupled into a laser rod to generate a gain for the first laser 200. The pump source 100 is operated at continuous wave mode or quasi-continuous wave mode. The pump laser wavelength is near 800 nm and is tuned to match the absorption lines of the gain medium of the first laser 200.

There are various pump schemes and pumping configurations well known in the art and some of them can be applied to the proposed application. The pump schemes include direct pumping, fiber coupling, and optics coupling. The pump configurations include side pump and end pump. One embodiment depicted in FIG. 3 belongs to the category of direct coupling and side pump. For the proposed application, the pump power is in the range of 10 to 100W.

The first laser 200 can a Q-switched, frequency doubled, Nd-doped laser. The Nd-doped laser media are chosen because of the availability of the high-power pump source of diode laser array. The Nd-doped laser media include Nd: YLF, Nd: YAG, and Nd: YVO4. The pump laser wavelength should be tuned to match the absorption band of these gain media.

This first laser 200 is Q-switched at a repetition rate of about 0.5 to 5 kHz and should produce laser pulses of 50 ns in duration or shorter. This laser is operated at a wavelength of about 1060 or 1320 nm. It is further frequency doubled to a wavelength near 530 or 660 nm, depending on the gain medium of the second laser 300. Pulse energy of about 2 to 10 mJ at the second harmonics of the first laser 200 should be obtained for the proposed application. The beam quality of this first laser 200 is less demanded. Multiple-mode operation at the low-order transverse mode is acceptable.

The Q-switching of the first laser 200 can be obtained with either an AO-modulator or an EO-modulator. Either intracavity or extra-cavity doubling can accomplish second harmonics generation of the first laser 200. Using cavity mirrors with proper coatings, one can choose the wavelength of the first laser 200. Various configurations known in the prior art can be employed for constructing a first laser 200. The configuration depicted in FIG. 3 utilizes intracavity doubling inside a folded linear cavity.

The output pulses from the first laser 200 pump the second laser 300. This second solid-state laser 300 is gain-switched to produce a laser pulse of about 1 ns in duration or shorter. The output of the second laser 300 also contains all the other parameters suitable for deep UV generation. It is a TEM00 laser beam. It has pulse energy of about 1 mJ. It has a wavelength around either 840 nm or 1060 nm so that the fourth or fifth harmonics will lead to a deep UV laser beam around 210 nm. Its spectrum bandwidth is of 0.01 nm or narrower so that efficient energy conversion to the UV power can be obtained.

The second laser 300 has a gain medium including Ti: sapphire, Cr: LiSAIF, or Nd-doped laser rods. With a Ti: sapphire crystal, the second laser 300 should be pumped at around 530 nm and produces a laser beam at a wavelength near 840 nm. With a Cr: LiSAIF crystal, the second laser 300 should be pumped at around 660 nm and produces a laser beam at a wavelength near 840 nm. With a Nd-doped laser rod, the second laser 300 should be pumped at around 530 nm and produces a laser beam at a wavelength near 1060 nm. Laser crystals Ti: sapphire and Cr: LiSAIF are more preferable because their output at 840 nm can be converted into deep UV beam at 210 nm by fourth harmonic generation. Output from a Nd-doped laser at 1060 nm needs a fifth harmonic generation to obtain a similar UV wavelength.

The output beam from the second solid-state laser 300 is directed into a wavelength converter 400 to produce a deep UV laser beam. The nonlinear crystal for the second or third harmonics generation can be KTP, LBO, BBO, or CLBO.

BBO is now the only crystal for the deep UV generation to 210 nm. CLBO is a potential one for the future. The crystal selection and the harmonics generations are well known in the art.

Figure 3A:
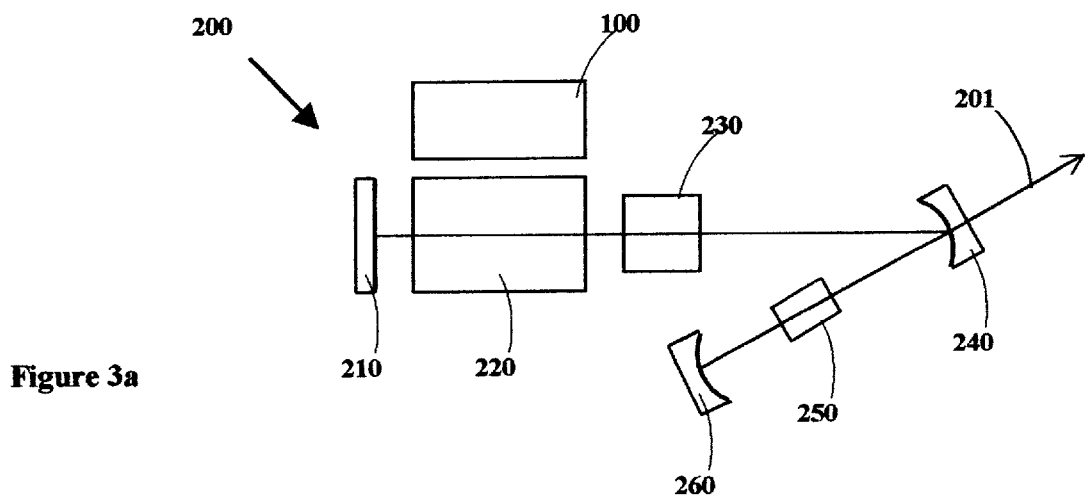
FIG. 3a shows a schematic diagram of a diode-pumped solid-state laser as one embodiment of the first laser.

FIG. 3a shows a schematic diagram of a diode-pumped solid-state laser as one embodiment of the first laser 200. It is a Q-switched, frequency doubled Nd: YAG laser. The laser 200 consists of a first end mirror 210, a laser head 220, a Q-switch 230, a fold mirror 240, a doubling crystal 250, and a second end mirror 260. It is pumped by a diode pump source 100 and produces an output laser beam 201.

The mirrors 210, 240, and 260 form the laser resonator. These mirrors all have high a reflection coating for the laser fundamental wavelength. Mirror 260 has also a high reflectivity for the laser second-harmonic wavelength. Mirror 240 has a high transmission to the laser second-harmonic wavelength and services as an output coupler of the first laser 200.

The first end mirror 210 is a flat mirror. The fold mirror 240 and the second end mirror 260 are concave spherical mirrors to form a beam waist at the doubling crystal 250. All intracavity elements 220, 230, and 250 have anti-reflection coatings on their surfaces interacting with the laser beam. A Brewster window, which is not shown in the diagram, may be inserted into the cavity to control the laser polarization.

The pump head 220 contains a Nd: YAG rod. The diode pump source 100 pumps the laser head directly from one side. The Nd: YAG rod has a few millimeters in diameter and a few centimeters in length. In an example of CW pump mode, the rod should absorb about 100-Watt pump power to produce enough output power for the proposed application.

The Q-switch 230 is an AO or EO modulator driven at a repetition rate of about 3 kHz. For a Nd: YAG laser, this is about the optimum repetition rate, beyond which the pulse energy drops. The Q-switching 230 is preferably fast for producing short pulses.

The doubling crystal 250 is a KTP or LBO. A KTP is preferable for its higher conversion efficiency. The KTP should be temperature controlled to obtain non-critical phase matching for more reliable operation and for eliminating the gray track problem.

The cavity length of the first laser 200 is preferably short for short pulse generation. With the compact laser head 220, the cavity length from the first end mirror 210 to the second end mirror 260 can be about 20 to 40 cm. The radial-curvatures of the spherical mirrors 240 and 260 and the space between the mirrors control the spot size of the cavity mode at the doubling crystal 250.

Under the above conditions, the first laser 200 can produce a pulsed laser beam 201 at 532 nm. The beam 201 can have a pulse repetition rate of about 3 kHz, pulse duration about 30 to 50 ns, and pulse energy of about 3 to 5 mJ. The output beam 201 may be of low transverse mode.

Figure 3B:
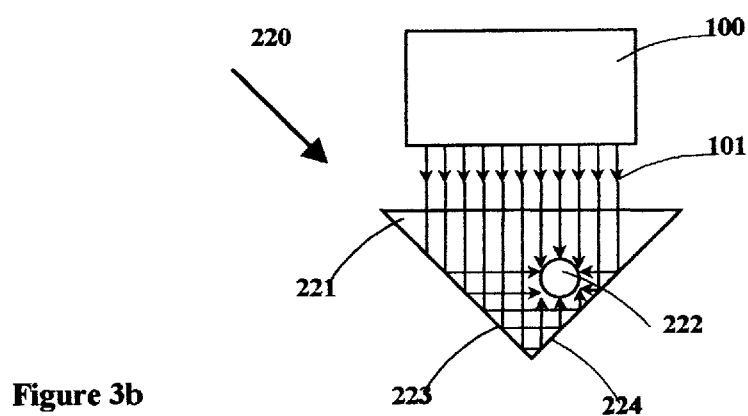
FIG. 3b is a schematic diagram showing a longitudinal cross-section of the pump head of the first laser.

FIG. 3b is a schematic diagram showing a longitudinal cross-section of the pump head 220 of the first laser 200. The pump head 220 includes a roof reflector 221 and a laser rod 222. The roof reflector 221 has total reflection surfaces 223 and 224, perpendicular from each other. A pump-laser beam 101 from the diode-pump source 100 pumps the laser rod 222 via the roof reflector 221.

The diode pump source 100 consists of one or more stacks of linear diode laser arrays. Each stacked array has an emission area of about 1 cm×1 cm and can deliver an output power of about 80 Watt at 808 nm. These stacked diode-laser arrays are commercially available from, for example, Semi-conductor Laser International Corporation of Binghamton, N.Y.

The output beam from a stacked array has a slow divergence angle of about 10 degrees and a fast divergence angle of about 40 degrees. The slow divergence angle is in a plane parallel to the arrays, and the fast divergence angle is in a plane normal to the arrays. In the present design as shown in FIGS. 3b and 3c, the slow divergent plane of the pump beam 101 is parallel with the end surface of the laser rod 222 while the fast divergent plane is parallel with the rod axis.

As illustrated in FIG. 3b, the laser rod 222 is located off the symmetric plane of the roof reflector 221 and the pump laser beam 101 pumps the rod 222 uniformly from four directions. For best coupling efficiency, the laser rod 222 should have a diameter about one fourth of the width of the pump laser beam 101. The width of the beam 101 is happen to be about 1 cm and fits the desirable rod diameter of about 2 to 2.5 mm.

Figure 3C:
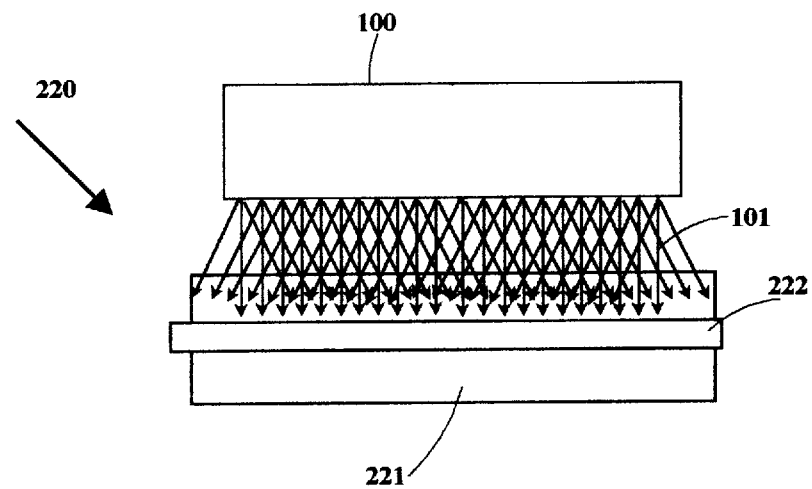
FIG. 3c is a cut-off diagram showing schematically a side view of the pump head.

FIG. 3c is a cut-off diagram showing schematically a side view of the pump head 220. Two stacked diode-laser arrays are used to produce a pump laser beam 101 up to 160 Watt. The two stacks are stacked longitudinally along the laser rod 222.

The roof reflector 221 can be simply a prismatic cell as described by M. Lai et al. (Applied Optics, Vol. 30, No. 30, pages 436514 4367, Oct. 20, 1991). The laser rod 222 is fixed across the reflector 221 and proper cooling is required. It is known to the art how to install a laser rod into a roof reflector (e. g., Jackson and Piper, Applied Optics, Vol. 34, No. 12, pages 2012–2023, Apr. 20, 1995).

The design shown in FIGS. 3b and 3c takes the advantage of the high-power stacked diode-laser arrays, which have become commercially available only recently. The proposed design meets nicely the two criteria of simplicity and high coupling efficiency. The stacked arrays pump the laser head 220 directly from one side and pump the laser rod 222 uniformly from four directions. There are commercial stacked arrays ready for this design configuration, which enables easy installation and replacement of the stacked arrays.

Figure 4A:
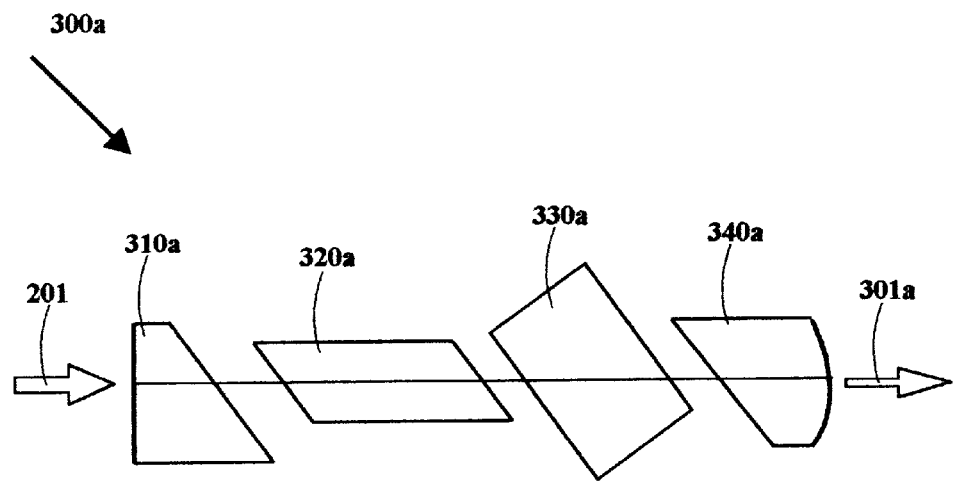
FIG. 4a shows a schematic diagram of a gain-switched laser as one embodiment of the second laser.

FIG. 4a shows a schematic diagram of a gain-switched laser as one embodiment of a second laser 300a. This second laser 300a includes a first end mirror 310a, a Ti: sapphire rod 320a, a birefringence filter 330a, and a second end mirror 340a. A laser beam 201 from the first laser 200 pumps the second laser 300a. The output beam 301a from this second laser 300a is designed to be suitable for deep UV generation for photo-refractive surgeries.

The first end mirror 310a and the second end mirror 340a form the resonant cavity of the second laser 300a. The first end mirror 310a and the second end mirror 340a have dielectric coatings on their out surfaces. The Ti: sapphire rod 320a is chosen as the gain medium because it is a good laser crystal and it can convert a pump beam near 530 nm into an output beam around 840 nm. The birefringence filter 330a is for controlling the laser wavelength and the laser spectral bandwidth.

The birefringence filter 330a operates at Brewster angle. The other intracavity surfaces are cut to Brewster angle for minimizing the intracavity loss and for eliminating astigmatism. The multiple Brewster surfaces enforce the linear polarization and reduce the laser spectral bandwidth.

The cavity design for this second laser is critical even though its structure is simple. To achieve good energy conversion efficiency, the intracavity loss should be small and the pulse build-up time should match the pump pulse duration. To achieve narrow spectral bandwidth, the number of round trips for the laser to build up should be big and thus the round trip gain should be small. To achieve shorter pulses, the laser cavity should be short, the ratio of gain to loss should be high, and the cavity loss should be high. To achieve good beam quality, the cavity should have strong discrimination of the TEM00 mode from the high transverse modes. The design parameters can be chosen to optimize for all the above considerations.

As an example, the following is a set of preferable parameters for the second laser 300a. The pump laser beam 201 has a wavelength of 532 nm, pulse energy of about 3.5 mJ, pulse duration of about 30 ns, and a pulse repetition rate of about 3 kHz. The beam 201 is of low order transverse mode and is focused to about 350 microns at the Ti: sapphire crystal 320a. The first end mirror 310a is a flat mirror with a high reflectivity at 840 nm and high transitivity at 530 nm. The second end mirror 340a is a concave mirror with a radial curvature of about 100 cm. It has a dielectric coating with a peak reflectivity of about 70% around 860 nm. The Ti: sapphire crystal 320a is about 1 cm long and absorbs about 95% of the pump power. The birefringence filter 330a is a three-plate quartz device with a total thickness of about 1 cm. The total cavity length is about 3 cm and the total intracavity loss is less than 2%.

With the above chosen parameters, the second laser 300a should have a pump pulse threshold of about 1.5 mJ and a maximum net round-trip gain of about 50%. This second laser 300a should produce a pulsed laser beam 301a of about 1 ns in pulse duration and about 1 mJ in pulse energy. Its beam profile should be of fundamental Gaussian beam. The spectral bandwidth of the output beam 301a should be narrower than 0.01 nm.

Figure 4B:
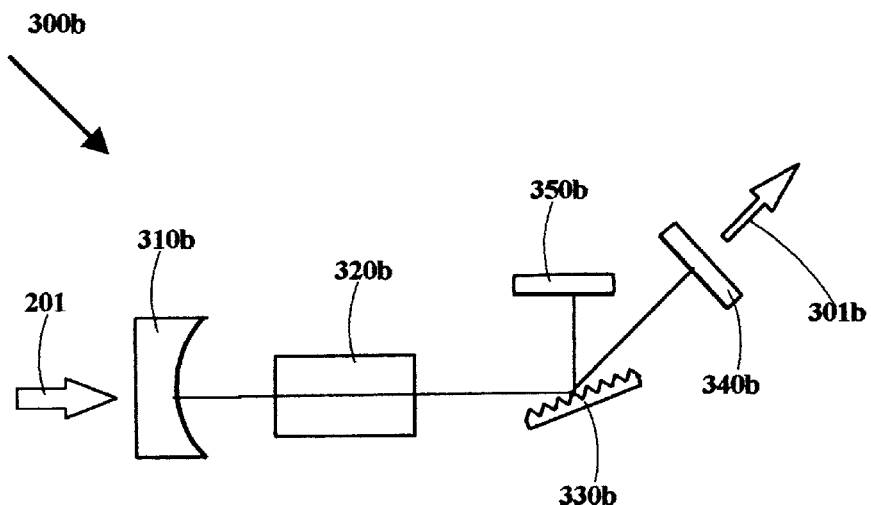
FIG. 4b shows a schematic diagram of a gain-switched laser as another embodiment of the second laser.

FIG. 4b shows a schematic diagram of a gain-switched laser as another embodiment of a second laser 300b. This second laser 300b includes a first end mirror 310b, a Ti: sapphire crystal 320b, a grating 330b, a second end mirror 340b, and a third end mirror 350b. A laser beam 201 from the first laser 200 pumps the second laser 300b. The output beam 301b from this second laser 300b is designed to be suitable for deep UV generation for photo-refractive surgeries.

The first end mirror 310b and the second end mirror 340b form a first resonant cavity via a zero-order diffraction of the grating 330b. The first end mirror 310b and the third end mirror 350b form a second resonant cavity via a first-order diffraction of the grating 330b. The first end mirror 310b is a concave spherical mirror and has a dielectric coating with high reflectivity at 840 nm and high transitivity at 530 nm. The second end mirror 340b is a flat mirror and serves as an output coupler. The third end mirror 350b is a flat mirror and has high reflection coating at 840 nm. The first and second resonant cavity combine to lower the laser threshold for a selected wavelength, which depends on the tuning angle of the third end mirror 350b.

The Ti: sapphire rod 320b is about 1 cm long and absorbs about 95% of the pump power. The grating 330b has a high dispersion at its first order diffraction and has a low device loss. The first end mirror 310b, the Ti: sapphire rod 320b, and the grating 330b are arranged as close as possible. The overall cavity length of either cavity is about 4 cm. The performance of this second laser 300b should be similar to that of the second laser 300a. In comparison with the second laser 300a, this second laser 300b has a narrower spectral bandwidth at a price of being more sensitive to misalignment.

The second solid-state laser 300 can alternatively be Q-switched with an additional AO or EO modulator. In such situation, the second Q-switch should be synchronized with the first Q-switch 230 of the first solid-state laser 200.

Now referring to FIG. 1, the diode-pumped solid-state cascade laser 10 can be a combination of a first laser of FIG. 3a and a second laser of FIG. 4a. Allowing independent optimization of the first and second lasers, the cascade laser 10 can produce an infrared laser beam 301a with a selected wavelength, short pulse duration, a narrow spectral bandwidth, a high repetition rate, and a good beam quality. These combined laser parameters are desirable for deep UV generation for photo-refractive surgeries.

The above figures and description are intended for illustrating the present invention. It is understood that various modifications can be made without departing from the scopes of the invention as defined in the appended claims.

I claim:

1. A diode-pumped solid-state cascade laser for deep UV generation comprising:

a diode pump source producing a pump laser beam of approximately 10 to 100 Watt near 800 nm;

a first solid-state laser having a Nd-doped rod pumped by said diode pump source, whereby said first solid-state laser is Q-switched and frequency-doubled to produce laser pulses with a wavelength near 530 or 660 nm, pulse duration shorter than 50 ns, pulse energy about 2 to 10 mJ, and a pulse repetition rate about 0.5 to 5 kHz; and a second solid-state laser pumped by said first solid-state laser, whereby said second solid-state laser is gain-switched to produce near TEM00-mode laser pulses with a wavelength near 840 or 1060 nm, pulse duration about 1 ns, pulse energy about 1 mJ, a pulse repetition rate about 0.5 to 5 kHz, and a spectral bandwidth about 0.01 nm.

2. A diode-pumped solid-state cascade laser as defined in claim 1 wherein said diode pump source includes a diode-laser array or a stack of the arrays.

3. A diode-pumped solid-state cascade laser as defined in claim 1 wherein said first solid-state laser includes a side-pumped Nd-doped laser employing a roof reflector in the laser head.

4. A diode-pumped solid-state cascade laser as defined in claim 1 wherein said second solid-state laser has a gain medium selected from Ti: sapphire, Cr: LiSAlF, or Nd-doped laser rods.

5. A diode-pumped solid-state cascade laser as defined in claim 1 wherein said second solid-state laser includes a gain-switched laser comprising:

a first end mirror;

a second end mirror, whereby said first and second end mirrors form a resonant cavity of about 3 to 5 cm long;

a laser rod located in said resonant cavity and pumped by a diode-pumped solid-state laser; and means to tune the laser wavelength and to control the spectral bandwidth.

6. A diode-pumped solid-state laser head comprising:

a roof reflector having an open side to receive incoming laser beam;

a laser rod located inside said roof reflector and offset from the symmetric plane of said roof reflector; and a stack of diode-laser arrays affixed near said open side of said roof reflector and pumping said laser rod uniformly from four sides via said roof reflector.

7. A diode-pumped solid-state laser head as defined in claim 5 wherein said roof reflector includes a prismatic cell.

8. A diode-pumped solid-state laser head as defined in claim 5 wherein said laser rod includes Nd: YAG, Nd: YLF, and Nd: YVO4.

9. A diode-pumped solid-state laser head as defined in claim 5 wherein said stack of diode-laser arrays include high power stacked array with emitting area of about 1 cm wide and 1 cm long.

10. A method for producing a diode-pumped cascade laser for deep UV generation comprising the steps of:

Providing a diode pump source with a wavelength near 800 nm;

Providing a first solid-state laser with a Nd-doped laser rod;

Pumping said first solid-state laser with said diode pump source;

Q switching said first solid-state laser to produce laser pulses of shorter than 50 ns at a repetition rate approximately 0.5 to 5 kHz;

Doubling the wavelength of said first solid-state laser to produce laser pulses near 530 or 660 nm with pulse energy of approximately 2 to 10 mJ;

Providing a second solid-state laser with a cavity length about 1 to 10 cm;

Pumping said second solid-state laser with laser pulses from said first solid-state laser to produce shorter laser pulses; and Tuning the wavelength of said second solid-state laser to near 840 or 1060 nm;

Wherein said second solid-state laser produces TEM00 mode laser pulses of about 1 ns in duration, about 1 mJ in pulse energy, about 0.5 to 5 kHz at repetition rate, and about 0.01 nm in spectral bandwidth.

11. A method for producing a diode-pumped cascade laser as defined in claim 10 wherein said providing a diode-laser source includes providing a stack of diode-laser arrays.

12. A method for producing a diode-pumped cascade laser as defined in claim 10 wherein said pumping first solid-state laser includes pumping in an end-pump or side-pump configuration.

13. A method for producing a diode-pumped cascade laser as defined in claim 10 wherein said pumping said first solid-state laser includes pumping in a CW or quasi CW mode.

14. A method for producing a diode-pumped cascade laser as defined in claim 10 wherein said Q-switching first solid-state laser includes Q-switching with an AO or EO modulator.

15. A method for producing a diode-pumped cascade laser as defined in claim 10 wherein said doubling the wavelength of said first solid-state laser is made by an intracavity or extracavity doubling technology.

* * * * *